(12) United States Patent
Teramoto

(10) Patent No.: US 11,121,578 B2
(45) Date of Patent: Sep. 14, 2021

(54) IMAGE FORMING APPARATUS IN WHICH WIRING PATTERN FOR WITHSTAND VOLTAGE TEST IS LAID OUT

(71) Applicant: CANON KABUSHIKI KAISHA, Tokyo (JP)

(72) Inventor: Hironobu Teramoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 16/721,714

(22) Filed: Dec. 19, 2019

(65) Prior Publication Data
US 2020/0212708 A1  Jul. 2, 2020

(30) Foreign Application Priority Data

Dec. 26, 2018 (JP) .............................. JP2018-243792

(51) Int. Cl.
| | |
|---|---|
| *H02J 9/00* | (2006.01) |
| *H02M 3/337* | (2006.01) |
| *G03G 13/02* | (2006.01) |
| *G03G 13/01* | (2006.01) |
| *G03G 11/00* | (2006.01) |

(52) U.S. Cl.
CPC ........... *H02J 9/005* (2013.01); *H02M 3/3376* (2013.01); *G03G 11/00* (2013.01); *G03G 13/0135* (2021.01); *G03G 13/02* (2013.01)

(58) Field of Classification Search
CPC .............................. H02J 9/005; H02M 3/3376
See application file for complete search history.

(56) References Cited

U.S. PATENT DOCUMENTS

| | | | | |
|---|---|---|---|---|
| 2018/0299810 A1* | 10/2018 | Miura | .................. | G03G 15/065 |
| 2018/0329334 A1* | 11/2018 | Tanaka | .................. | G03G 15/36 |
| 2019/0079427 A1* | 3/2019 | Katoh | ................ | G03G 15/0258 |
| 2019/0222112 A1* | 7/2019 | Sakai | ..................... | G03G 15/80 |

FOREIGN PATENT DOCUMENTS

JP    2011-082296 A    4/2011

\* cited by examiner

*Primary Examiner* — Rexford N Barnie
*Assistant Examiner* — Elim Ortiz
(74) *Attorney, Agent, or Firm* — Canon U.S.A., Inc. I.P. Division

(57) ABSTRACT

An interlock power supply stops supplying a voltage if AC power supply is supplying AC voltage and an interlock condition is satisfied, and supplies a voltage if AC power supply is supplying AC voltage and the condition is not satisfied. A non-interlock power supply supplies a voltage independently of the condition, if AC power supply is supplying AC voltage. A first wiring pattern that connects an interface and a switch drive circuit. A second wiring pattern is connected to the non-interlock power supply. A constant-voltage element is provided between a first section of the first wiring pattern and a second section of the first wiring pattern.

16 Claims, 6 Drawing Sheets

IMAGE FORMING APPARATUS IN WHICH WIRING PATTERN FOR WITHSTAND VOLTAGE TEST IS LAID OUT

BACKGROUND

Field of the Disclosure

The present disclosure relates to an image forming apparatus.

Description of the Related Art

In a process of assembling an image forming apparatus, a withstand voltage test is carried out to check whether or not reinforced insulation conforming to the safety standard is ensured. During the test, a test voltage for the withstand voltage test is applied to an AC input portion (such as a power supply plug). Since a relay for interlocking is provided on a power supply line that connects the AC input portion and an AC load to each other, a bridge resistance for the withstand voltage test is attached to the relay. Due to this configuration, the test voltage is applied to an AC load, such as a fixing heater, via the bridge resistance.

The bridge resistance now needs to be removed due to a revision of the safety standard. That is to say, it is necessary to make it possible to input a driving voltage from an external power supply, turn on the relay by applying the driving voltage to the relay, and apply the test voltage to the AC load via the relay. An interface, which is connected to the external power supply, and a wiring pattern for connecting the interface and a drive circuit to each other are mounted on a circuit board. The circuit board includes a wiring pattern that is connected to an interlock power supply and a wiring pattern that is connected to a non-interlock power supply, and the distance defined by the safety standard needs to be ensured between these two types of wiring patterns. Note that, due to the safety standard, the wiring pattern that connects the interface and the drive circuit to each other is handled similarly to the wiring pattern that is connected to the interlock power supply. Japanese Patent Laid-Open No. 2011-82296 proposes providing a slit between adjacent wiring patterns, instead of expanding the circuit board size and ensuring an insulation distance.

If changes in circuit board design for meeting the revised safety standard can be reduced, a reduction in the designing time and manufacturing costs for an image forming apparatus will be achieved. That is to say, a configuration is needed in which a wiring pattern for the withstand voltage test can be added while not changing existing wiring patterns on the circuit board to the extent possible. In the case where the distance between two existing wiring patterns is designed to be the distance defined by the safety standard, if the wiring pattern for the withstand voltage test is added between these two wiring patterns, the distances between the wiring pattern for the withstand voltage test and the existing wiring patterns are smaller than the distance defined by the safety standard. If a slit such as one described in Japanese Patent Laid-Open No. 2011-82296 is provided in order to ensure the distance defined by the safety standard, the strength of the circuit board may decrease, or a solder crack may occur. If the size of the circuit board is increased in order to ensure the distance defined by the safety standard, the designing time and manufacturing costs may increase according to an increase in the apparatus size.

SUMMARY

The present disclosure provides an image forming apparatus comprising the following elements. An input portion to which an AC voltage is input from an AC power supply or to which a test voltage is input from a test power supply. That is, the AC voltage or the test voltage may be inputted to the input portion. A power supply line that connects the input portion and an AC load used in image formation to each other. A switch provided on the power supply line. An interlock power supply configured to stop supplying a voltage if the AC power supply is supplying the AC voltage and an interlock condition is satisfied, and configured to supply a voltage if the AC power supply is supplying the AC voltage and the interlock condition is not satisfied. The interlock condition is a condition where an interlock acts. A non-interlock power supply configured to supply a voltage independently of the interlock condition, if the AC power supply is supplying the AC voltage. An interface to which an external power supply is connected. A switch drive circuit configured to turn on the switch based on a predetermined switch-on signal in a state where the voltage from the interlock power supply is supplied, or due to the test voltage being supplied from the test power supply via the input portion and an operating voltage being supplied from the external power supply in a state where the voltage from the interlock power supply is not supplied. A first wiring pattern that connects the interface and the switch drive circuit to each other. A second wiring pattern that is connected to the non-interlock power supply. A constant-voltage element provided on the first wiring pattern. The constant-voltage element is provided between a first section of the first wiring pattern in which a distance between the first wiring pattern and the second wiring pattern satisfies a predetermined insulating condition, and a second section of the first wiring pattern in which the distance between the first wiring pattern and the second wiring pattern does not satisfy the predetermined insulating condition.

Further features of the present disclosure will become apparent from the following description of exemplary embodiments (with reference to the attached drawings).

DESCRIPTION OF THE EMBODIMENTS

Figure 1:
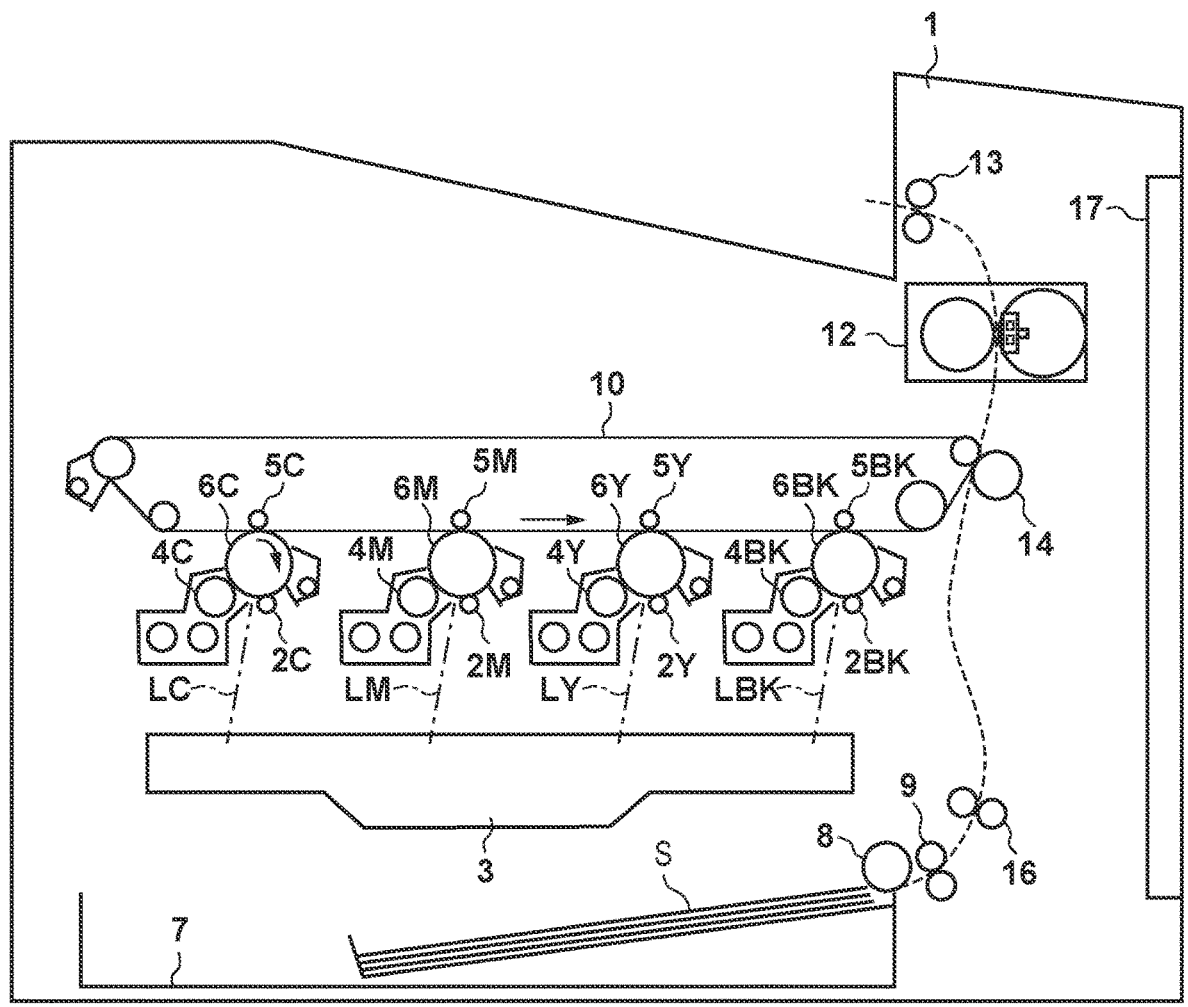
FIG. 1 is a cross-sectional view that illustrates an image forming apparatus.

Hereinafter, an embodiment will be described in detail with reference to the attached drawings. Note that the following embodiment is not intended to limit the disclosure according to the claims. Although the embodiment describes a plurality of features, not all of these features are necessarily essential for the disclosure, and the features may also be combined in any manner. Furthermore, in the attached drawings, the same or similar constituent elements are assigned the same reference numerals, and redundant descriptions are omitted.

Image Forming Apparatus

FIG. 1 shows an image forming apparatus 1 of an intermediate transfer type. Although the image forming apparatus 1 may be an image forming apparatus that forms monochrome images, the image forming apparatus 1 in this embodiment is an image forming apparatus of an electrophotographic type that mixes a plurality of color agents and forms multi-color images. The image forming apparatus 1 uses developing agents of four colors, namely yellow (Y), magenta (M), cyan (C), and black (BK). Although letters that indicate colors follow the end of the reference numerals in FIG. 1, these letters are omitted when items common to the four colors are described.

Photosensitive drums 6C, 6M, 6Y, and 6BK are image carriers that are arranged at equal intervals and each carry an electrostatic latent image and a toner image. Primary chargers 2 are an example of charging units for uniformly charging the image carriers. Each of the image carriers 2 uniformly charges the surface of a corresponding photosensitive drum 6 using a charging voltage. A scanning optical device 3 is an example of a scanning unit that forms an electrostatic latent image by scanning laser light on the surface of the image carriers. The scanning optical device 3 outputs laser beams L, each of which has been modulated based on an image, to the respective photosensitive drums 6. The laser beams L form electrostatic latent images on the surface of the photosensitive drums 6. Developers 4 attach cyan, magenta, yellow, and black developing agents to the electrostatic latent images through sleeves and blades to which a developing voltage is applied. Thus the electrostatic latent images are developed, and developing agent images (toner images) are formed.

A feed roller 8 feeds sheets S contained in a feed tray 7 one-by-one. A separation roller 9 separates a single sheet S from a plurality of sheets S that are fed by the feed roller 8, and sends the separated sheet S to a conveyance path. A conveyance roller 16 sends the sheet S toward a secondary transfer portion synchronously with an image write timing.

Primary transfer rollers 5 transfer toner images carried by the respective photosensitive drums 6 to an intermediate transfer belt 10. A primary transfer voltage applied to the primary transfer rollers 5 promotes the transfer of the toner images to the intermediate transfer belt 10. The intermediate transfer belt 10 functions as an intermediate transfer body. A drive roller 11 is a roller for rotating the intermediate transfer belt 10. The secondary transfer portion has a secondary transfer roller 14. In the secondary transfer portion, a multi-color toner image carried on the intermediate transfer belt 10 is transferred to the sheet S due to the intermediate transfer belt 10 and the secondary transfer roller 14 sandwiching and conveying the sheet S. A secondary transfer voltage promotes the transfer of the toner image to the sheet S. Thereafter, the sheet S is conveyed to a fixing device 12. The fixing device 12 applies pressure and heat to the toner image carried on the sheet S to fix the toner image thereto. A discharge roller 13 discharges the sheet S with an image formed thereon. Note that the primary transfer rollers 5, the intermediate transfer belt 10, and the secondary transfer roller 14 are an example of a transfer unit that transfers a toner image onto a sheet. The fixing device 12 is an example of a fixing unit that fixes the toner image carried on the sheet. A maintenance door 17 is a door that is opened when maintenance of the image forming apparatus 1 is performed.

Circuit Configuration

Figure 2:
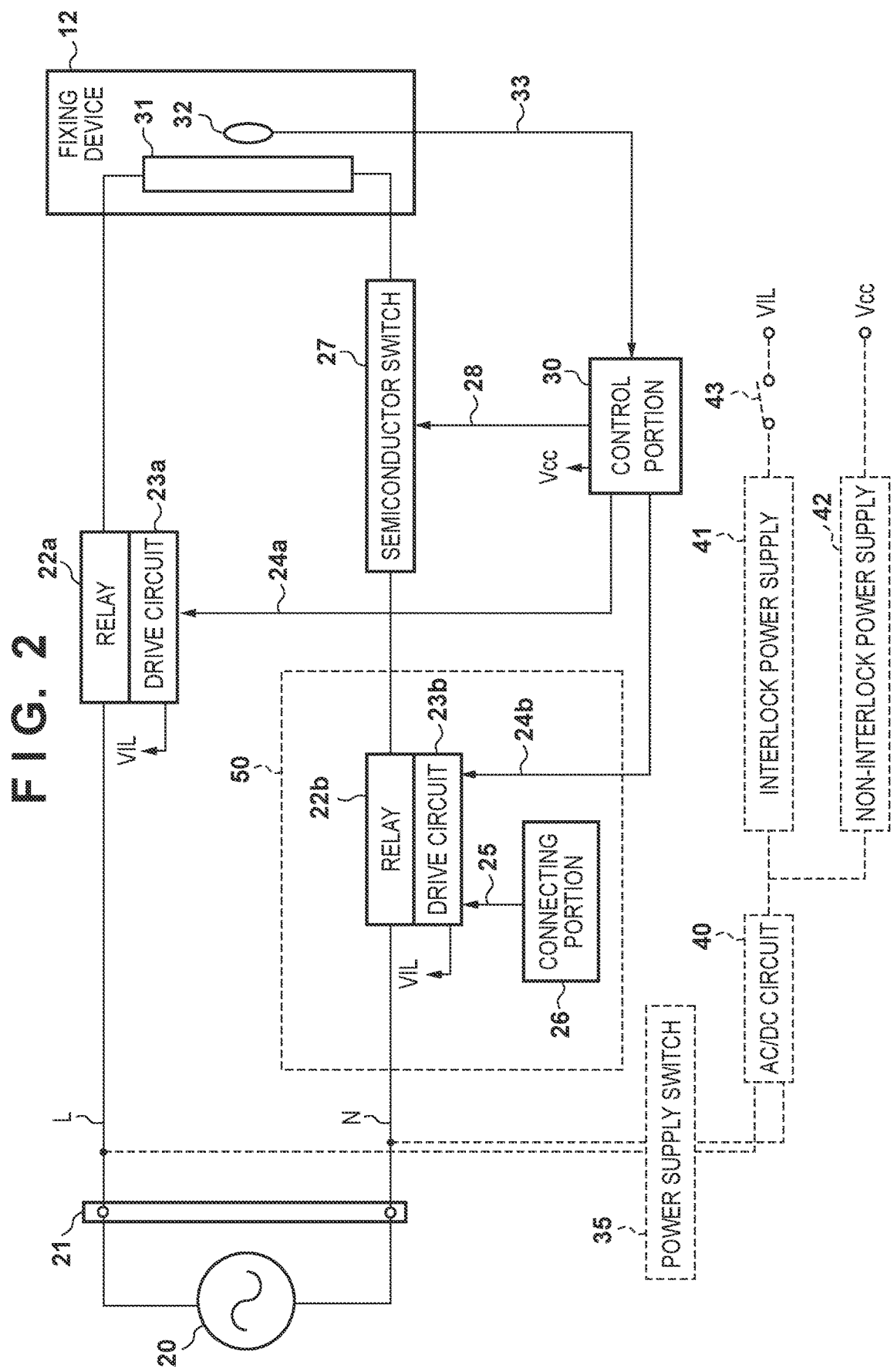
FIG. 2 illustrates a power supply circuit that supplies power to an AC load.

FIG. 2 illustrates a power supply circuit. An AC power supply 20, such as a commercial AC power supply, is connected to an AC input portion 21, such as a power supply plug. The AC input portion 21 and a fixing heater 31, which is an AC load, of the fixing device 12 is connected to each other via a live line L and a neutral line N. An AC voltage supplied from the AC power supply 20 is applied to the fixing heater 31 via the live line L and the neutral line N. Note that the live line L may also be called a hot line, and the neutral line N may also be called a cold line.

A relay 22a is connected to the live line L, and a relay 22b is connected to the neutral line N. Note that letters a and b that follow the end of the reference numerals are omitted in the description of common items. The relays 22 are switched between a connecting state and a disconnecting state by the respective drive circuits 23. A voltage VIL, which serves as an operating voltage, is supplied from an interlock power supply 41 to the drive circuits 23. Also, an ON signal 24 for switching the relays 22 from the disconnecting state to the connecting state is supplied from a control portion 30 to the drive circuit 23. For example, the control portion 30 outputs the ON signal 24 when in an image forming mode, and stops the output of the ON signal 24 when in a power saving mode. Note that the connecting state may also be called an ON state, and the disconnecting state may also be called an OFF state.

The control portion 30 outputs a control signal 28 to a semiconductor switch 27 such that the temperature indicated by a temperature detection signal 33 output by a temperature sensor 32 approaches a target temperature. The semiconductor switch 27 is a triac or the like. The semiconductor switch 27 turns on and off in accordance with the control signal 28, and controls power applied to the fixing heater 31.

A connecting portion 26 is an interface to which an external power supply is connected. The external power supply is connected to the connecting portion 26 when a withstand voltage test for the image forming apparatus 1 is carried out, and applies, to the drive circuit 23b, a DC voltage for switching the relay 22b to the connecting state. The connecting portion 26 and the drive circuit 23b are connected to each other via a circuit board pattern 25. When the withstand voltage test for the image forming apparatus 1 is performed, a test power supply, in place of the commercial AC power supply, is connected between the AC input portion 21 and ground. The neutral line N and the live line L are short-circuited at the AC input portion 21. Since the voltage VIL is not supplied during the withstand voltage test, the relay 22b enters the connecting state due to the voltage supplied from the external power supply that is connected to the connecting portion 26.

A power supply switch 35 is also called a main switch, and is connected between the AC input portion 21 and an AC/DC circuit 40, which is a power supply circuit. The AC/DC circuit 40 converts the AC voltage supplied from the AC power supply 20 to a predetermined DC voltage. The interlock power supply 41 is a circuit that converts the DC voltage supplied from the AC/DC circuit 40 to the voltage VIL. An interlock switch 43 is a switch that turns off/on in conjunction with the opening/closing of the maintenance door 17. That is to say, the voltage VIL is not supplied to the drive circuit 23 if the maintenance door 17 is open, and the voltage VIL is supplied to the drive circuit 23 if the maintenance door 17 is closed. The interlock switch 43 may be provided in the interlock power supply 41, or may be provided between the AC/DC circuit 40 and the interlock power supply 41. A non-interlock power supply 42 is a circuit that converts the DC voltage supplied from the AC/DC circuit 40 to a voltage Vcc. The non-interlock power supply 42 supplies the voltage Vcc to the control portion 30 and other parts, independently of whether the maintenance door 17 is open or closed.

Since the bridge resistance has been removed, no bridge resistance is shown in FIG. 2. If the bridge resistance is attached, usually, one end of the bridge resistance is connected to the neutral line N between the AC input portion 21 and the relay 22b. The other end of the bridge resistance is connected to the live line L between the relay 22a and the fixing heater 31.

Wiring Patterns

Figure 3:
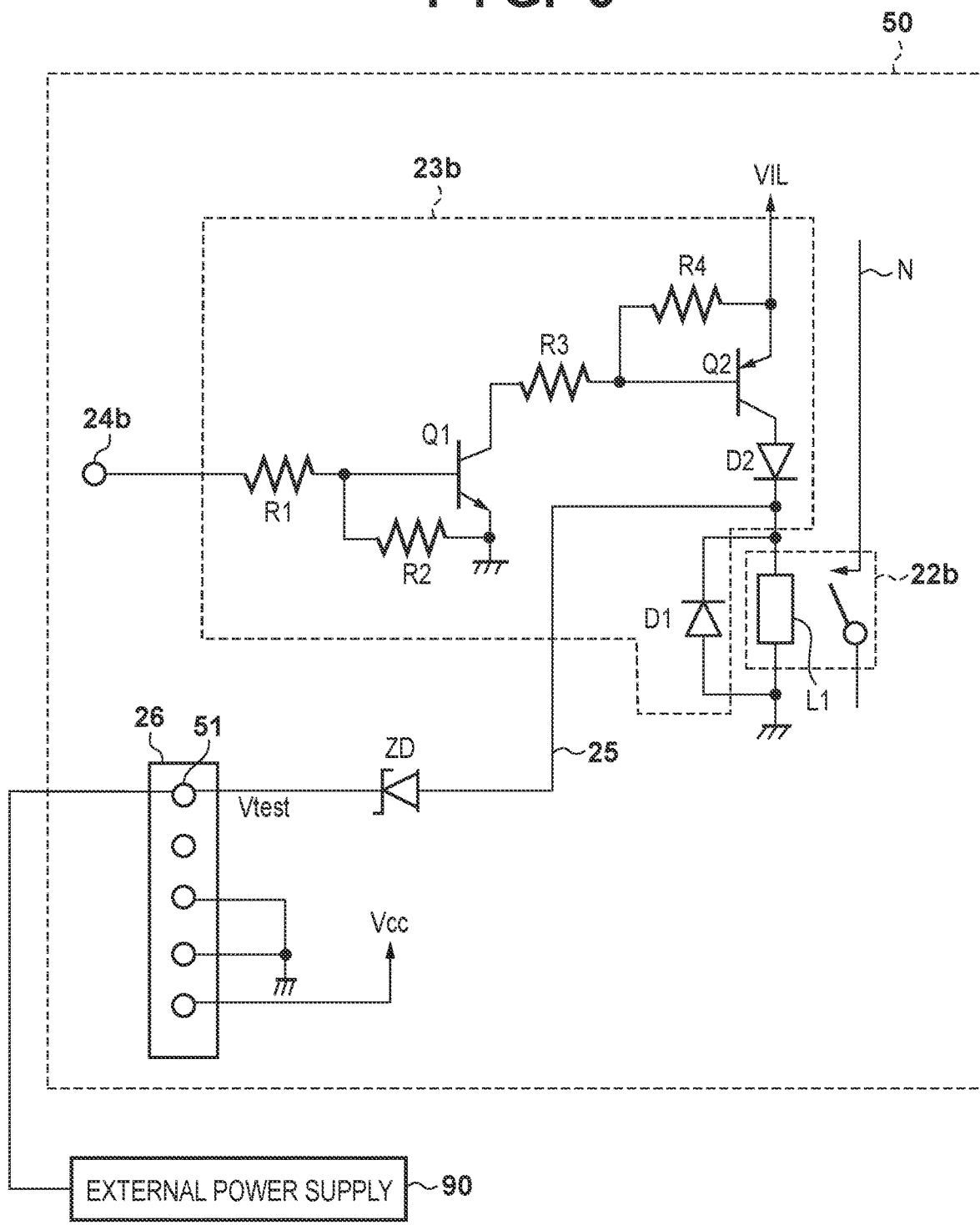
FIG. 3 illustrates a drive circuit.

FIG. 3 is a circuit diagram showing a circuit in a frame 50 shown in FIG. 2. The drive circuit 23b operates using the voltage VIL supplied from the interlock power supply 41. The drive circuit 23b turns on the relay 22b by causing a drive current to flow through a coil L1 in the relay 22b. The drive current is controlled by an npn transistor Q1 and a pnp transistor Q2. A current-limiting resistor R1 is connected to a base of the transistor Q1. A current-limiting resistor R2 is also connected between the base and an emitter of the transistor Q1. The emitter of the transistor Q1 is grounded. The voltage VIL is applied to an emitter of the transistor Q2. A current-limiting resistor R3 is connected to a base of the transistor Q2. The resistor R3 is connected to a collector of the transistor Q1. A current-limiting transistor R4 is also connected to the base and the emitter of the transistor Q2. The collector of the transistor Q2 is connected to one end of the coil L1 in the relay 22b via a diode D2. The other end of the coil L1 is grounded.

Upon an ON signal 24b, which is input from the control portion 30 via the resistor R1 to the base, switching to a high level, the transistor Q1 turns on, and the transistor Q2 also turns on. Furthermore, the relay 22b turns on due to the transistor Q2 turning ON. Upon the ON signal 24b switching to a low level, the relay 22b turns off. As a result of the relay 22b changing from ON to OFF, a back electromotive force is generated in the coil L1. For this reason, a regenerative diode D1 is connected to the coil L1 in parallel in order to allow a current to flow, the current being generated due to the back electromotive force being generated in the coil L1.

During the withstand voltage test, the voltage VIL is not generated. For this reason, a voltage Vtest for turning on the relay 22b is needed in place of the voltage VIL. That is to say, during the withstand voltage test, an external power supply 90 applies the voltage Vtest to an input terminal 51 of the connecting portion 26. The input terminal 51 is connected to a cathode of a Zener diode ZD. An anode of the Zener diode ZD is connected, via the circuit board pattern 25, to a cathode of the diode D2 and one end of the coil L1. The relay 22b is turned on by the voltage Vtest applied thereto via the circuit board pattern 25. The diode D2 is a restricting element for preventing the voltage Vtest that is applied from the external power supply 90 during the withstand voltage test from flowing into the interlock power supply 41.

Figure 4:
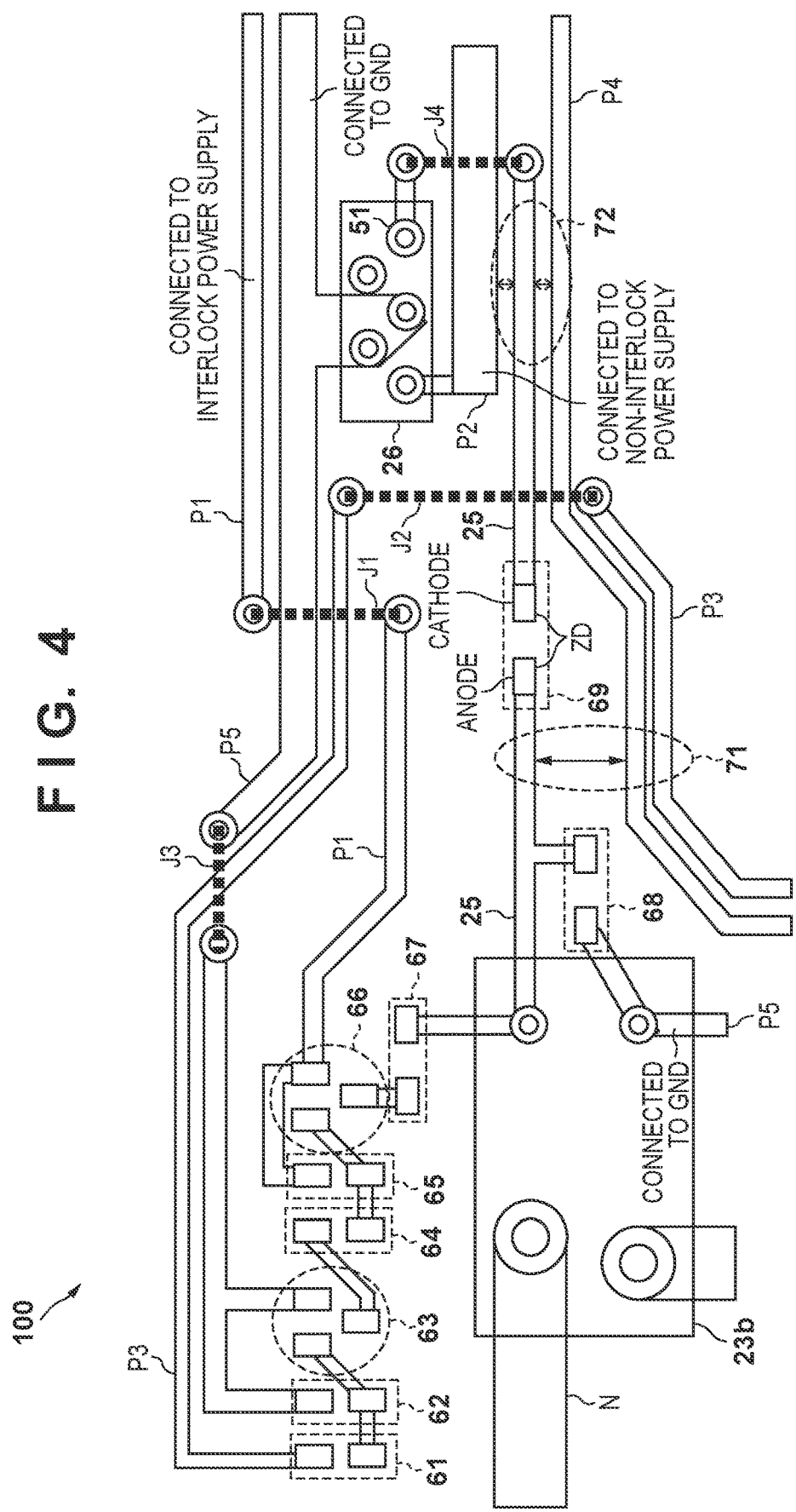
FIG. 4 illustrates wiring patterns.

FIG. 4 illustrates a circuit board 100 to which the circuit shown in FIG. 3 is mounted. In FIG. 4, thick dashed lines J1 to J4 indicate jumper wires. A pattern P1 is a circuit board pattern (wiring pattern) connected to the interlock power supply 41. Patterns P2 and P4 are circuit board patterns connected to the non-interlock power supply 42. A pattern P3 is a circuit board pattern for sending the ON signal 24b. The pattern P5 is a circuit board pattern that is connected to a ground potential.

The resistor R1 is connected to a land 61. The resistor R2 is connected to a land 62. The transistor Q1 is connected to a land 63. The resistor R3 is connected to a land 64. The resistor R4 is connected to a land 65. The transistor Q2 is connected to a land 66. The diode D2 is connected to a land 67. The Zener diode ZD is connected to a land 69. The regenerative diode D1 is connected to a land 68.

The circuit board pattern 25 has a first section 71 in which the anode of the Zener diode ZD and the relay 22b are connected to each other, and a second section 72 in which the cathode of the Zener diode ZD and the input terminal 51 are connected to each other. In the second section 72, which is located close to the connecting portion 26, the distance between the pattern P2 for the non-interlock power supply 42 and the circuit board pattern 25 is smaller than a predetermined insulating distance (e.g. 1 mm). In the first section 71, the distance between the pattern P4 for the non-interlock power supply 42 and the circuit board pattern 25 is greater than or equal to the predetermined insulating distance (e.g. 1 mm). The Zener diode ZD is connected to the circuit board pattern 25 between the first zone 71 and the second zone 72. More specifically, the anode of the Zener diode ZD is connected to a land on the first section 71 side, and the cathode of the Zener diode ZD is connected to a land on the second section 72 side. If the pattern P2 or P4 and the circuit board pattern 25 are short-circuited in the second section 72, the voltage Vcc at the non-interlock power supply 42 will be applied to the circuit board pattern 25. If the Zener diode ZD is not provided, the voltage Vcc will turn on the relay 22b. In this embodiment, the Zener diode ZD keeps the voltage Vcc from being applied to the coil L1, and thus, the relay 22b is maintained in the OFF state.

A constant voltage (breakdown voltage) Vzd1 of the Zener diode ZD is selected so as to satisfy the following equation.

$$Vzd1 \geq Vcc - Vrl\_off \tag{1}$$

Here, Vrl_off denotes an OFF voltage (release voltage) of the relay 22b. For example, if Vcc=12V and Vrl_off=1V, Vzd1 is set to a value that is 11V or greater. The voltage Vtest of the external power supply 90 is selected so as to satisfy the following equation.

$$Vtest > Vzd1 + Vrl\_on \tag{2}$$

Here, Vrl_on denotes an ON voltage of the relay 22b. For example, if Vzd1=11V and Vrl_on=8V, Vtest is set to 19V or greater.

Modifications

Figure 5:
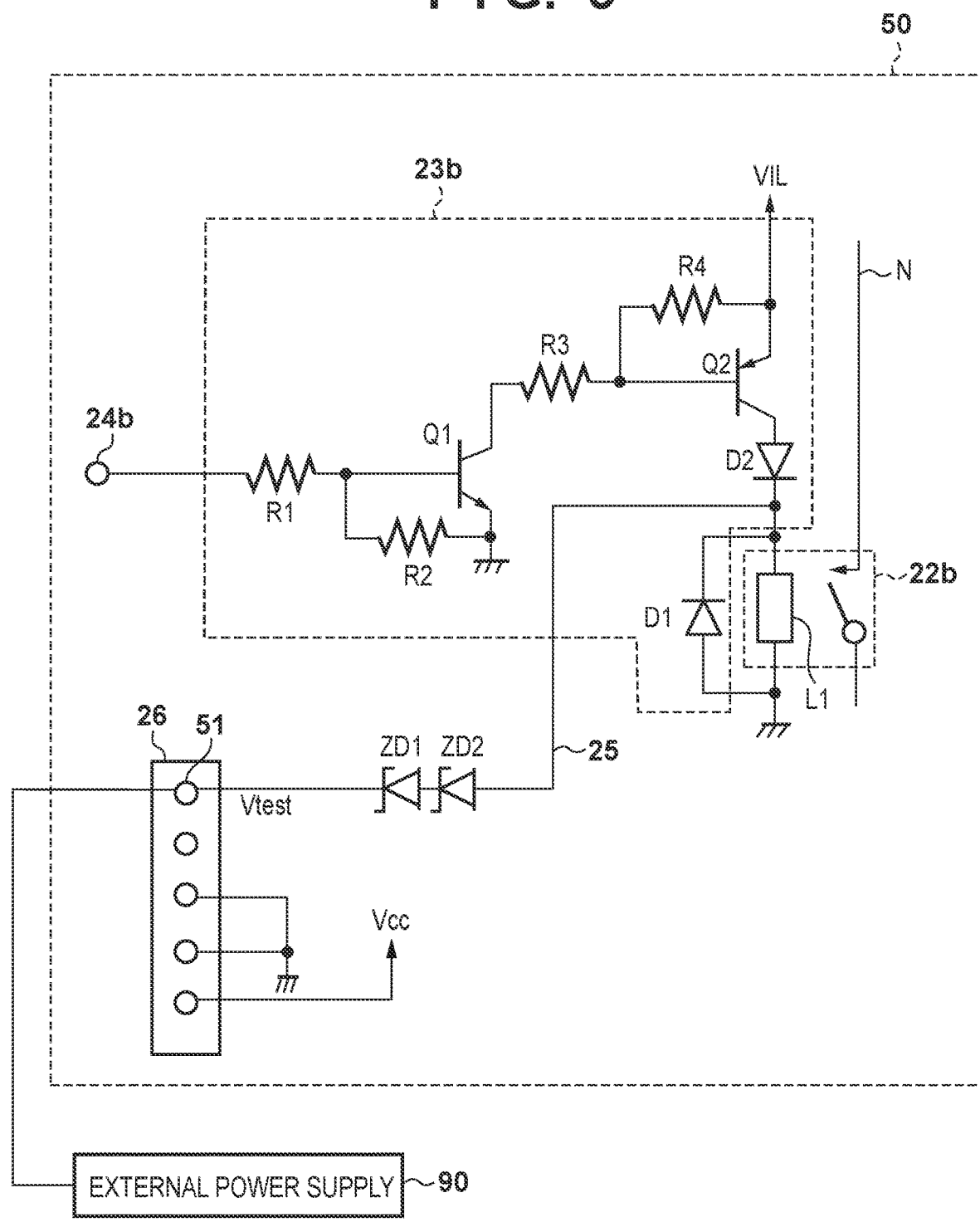
FIG. 5 illustrates a drive circuit.

Although a single Zener diode ZD is employed in FIGS. 3 and 4, a plurality of Zener diodes may be employed. As shown in FIG. 5, the input terminal 51 is connected to a cathode of a Zener diode ZD1. An anode of the Zener diode ZD1 is connected to a cathode of a Zener diode ZD2. An anode of the Zener diode ZD2 is connected, via the circuit board pattern 25, to the cathode of the diode D2 and one end of the coil L1. Thus, the Zener diodes ZD1 and ZD2 are connected in series.

Figure 6:
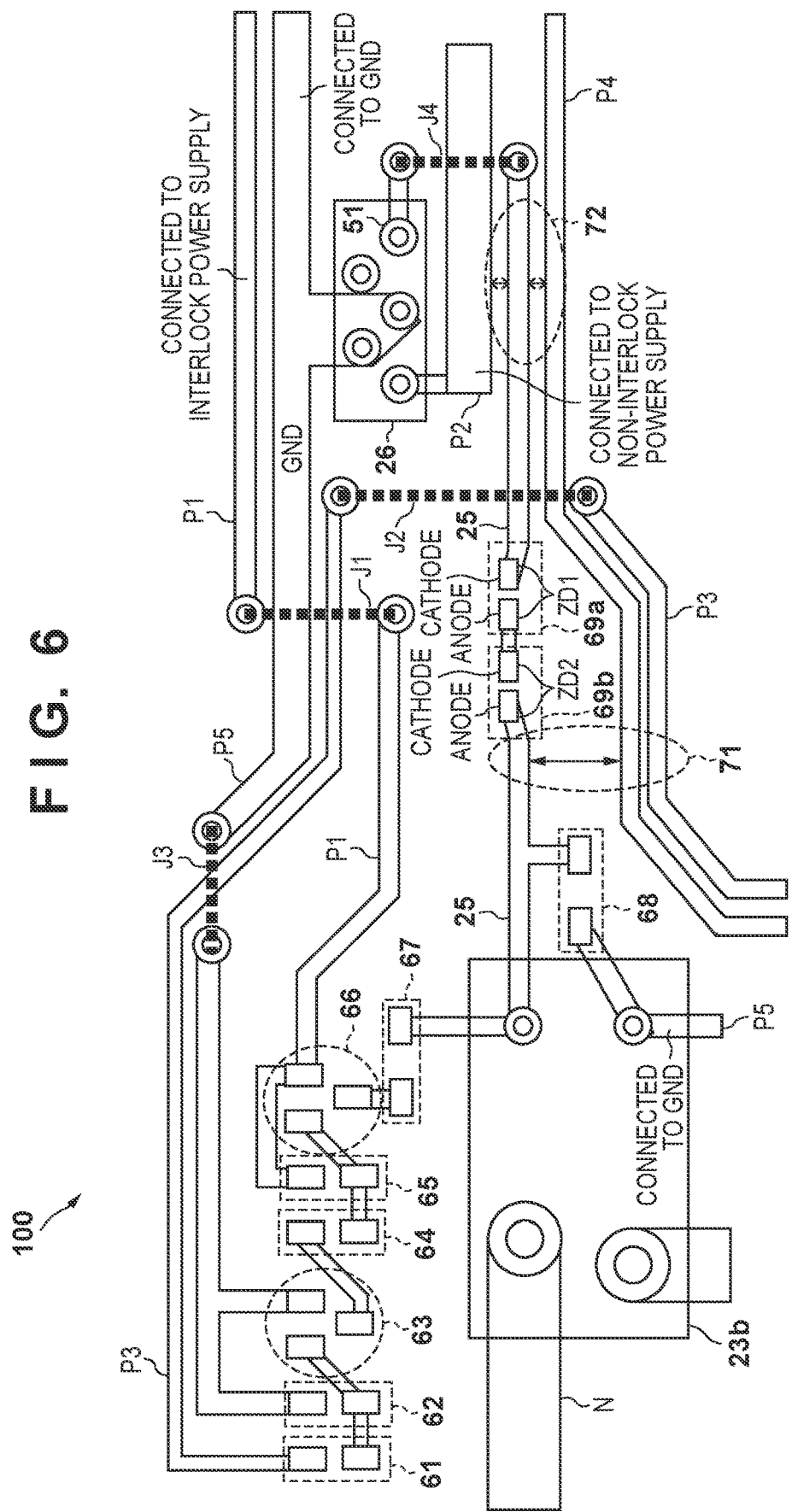
FIG. 6 illustrates wiring patterns.

As shown in FIG. 6, the Zener diode ZD1 is connected to a land 69a. The Zener diode ZD2 is connected to a land 69b. The anode of the Zener diode ZD2 is connected to the first section 71. The cathode of the Zener diode ZD1 is connected to the second section 72.

Here, the sum of a constant voltage Vzd2 of the Zener diode ZD1 and a constant voltage Vzd3 of the Zener diode ZD2 is selected such that the sum is the aforementioned Vzd1. From the viewpoint of cost reduction, elements with the same specifications may be employed as the Zener diodes ZD1 and ZD2. In this case, Vzd2=Vzd3 holds.

SUMMARY

As indicated by FIG. 2 etc., the AC input portion 21 is an example of an input portion to which an AC voltage is input from the AC power supply 20 or to which a test voltage is input from a test power supply. Each of the live line L and the neutral line N is an example of a power supply line that connects the input portion and an AC load used in image formation to each other. The relay 22b is an example of a switch provided on the power supply line. The interlock power supply 41 stops supplying a voltage if the AC power supply 20 is supplying an AC voltage and an interlock condition is satisfied. The interlock condition is a condition where an interlock acts. That is, when the interlock condition is satisfied, the interlock can act. The interlock condition may be that the maintenance door 17 is open. The interlock power supply 41 supplies a voltage if the AC power supply 20 is supplying an AC voltage and the interlock condition is not satisfied. The non-interlock power supply 42 supplies a voltage if the AC power supply 20 is supplying an AC voltage, independently of the interlock condition. The drive circuit 23b is an example of a switch drive circuit that turns on a switch based on a predetermined switch-on signal in a state where the voltage from the interlock power supply 41 is being supplied thereto. Also, the drive circuit 23b is an example of a switch drive circuit that turns on the switch due to the test voltage being supplied from the test power supply via the input portion and an operating voltage being supplied from an external power supply in a state where the voltage from the interlock power supply 41 is not supplied. The connecting portion 26 is an example of an interface connected to the external power supply 90. The circuit board pattern 25 is an example of a first wiring pattern that connects an interface (connecting portion 26) and a control circuit to each other. Each of the wiring patterns P2 and P4 is an example of a second wiring pattern that is connected to the non-interlock power supply 42. Each of the Zener diodes ZD, ZD1, and ZD2 is an example of a constant-voltage element provided on the first wiring pattern. As indicated in FIGS. 4 and 6, the constant-voltage element is provided between the first section 71 and the second section 72. The first section 71 is a section in which the distance between the first wiring pattern and the second wiring pattern satisfies a predetermined insulating condition. The second section 72 is a section in which the distance between the first wiring pattern and the second wiring pattern does not satisfy the predetermined insulating condition. By thus arranging the constant-voltage element, the voltage Vcc applied from the second wiring pattern to the first wiring pattern can be kept from operating a switch. Also, by arranging the constant-voltage element, a slit such as that described in Japanese Patent Laid-Open No. 2011-82296 is not needed between the second wiring pattern and the first wiring pattern. Accordingly, the strength of the circuit board will be unlikely to decrease, and a solder crack will also be unlikely to occur. Thus, according to this embodiment, a wiring pattern for turning on the relay 22b can be laid out for the purpose of a withstand voltage test, without decreasing the strength of the circuit board.

The constant-voltage element may be a constant-voltage diode, for example. The constant-voltage diode may be a Zener diode. A Zener diode, which can be readily obtained in the market, can be readily employed in this embodiment. The anode of the Zener diode ZD is connected to the first section 71 of the first wiring pattern, and the cathode of the Zener diode ZD is connected to the second section 72 of the first wiring pattern. The Zener diode does not allow a current to flow until a reverse voltage that is greater than or equal to the breakdown voltage is applied thereto. Using this property, the voltage Vcc can be kept from operating the switch.

As indicated in FIGS. 5 and 6, the constant-voltage element may be a plurality of constant-voltage diodes that are connected in series. The plurality of constant-voltage diodes may be a plurality of Zener diodes. For example, the breakdown voltage of the Zener diode ZD is higher than the breakdown voltage of each of the Zener diodes ZD1 and ZD2. For this reason, it may be difficult to obtain the Zener diode ZD in the market, compared with the Zener diodes ZD1 and ZD2. Accordingly, a plurality of constant-voltage diodes that are easier to obtain may be employed. As indicated in FIGS. 5 and 6, the anode of the second Zener diode ZD2, of the plurality of Zener diodes, is connected to the first section 71 of the first wiring pattern. The cathode of the first Zener diode ZD1, of the plurality of Zener diodes, is connected to the second section 72 of the first wiring pattern. The cathode of the second Zener diode ZD2 is connected to the anode of the first Zener diode ZD1.

When a withstand voltage test for the image forming apparatus 1 is carried out, the AC power supply 20 is not connected to the input portion, but a test power supply is connected thereto, and the external power supply 90 is connected to an interface (connecting portion 26). The voltage Vtest supplied from the external power supply 90 is greater than or equal to the sum of the constant voltage (e.g. Vzd1) realized by the constant-voltage element and the operating voltage (e.g. Vrl_on) that is required to turn on the switch. Thus, the switch can be turned on by the voltage Vtest.

The constant voltage (e.g. Vzd) of the constant-voltage element is a voltage with which the switch does not turn on even if the voltage (e.g. Vcc) applied to the second wiring pattern is applied to the first wiring pattern. Thus, even if the first wiring pattern and the second wiring pattern are short-circuited, the switch can be kept from turning ON.

The difference between the voltage applied to the second wiring pattern and the constant voltage of the constant-voltage element is lower than the voltage (e.g. Vrl_off) that is required to turn off the switch. The difference between the voltage Vtest supplied from the external power supply 90 and the constant voltage (e.g. Vzd1) of the constant-voltage element is greater than or equal to the voltage that is required to turn on the switch. This configuration makes it possible to smoothly carry out the withstand voltage test while reducing the effect of short-circuiting between the first wiring pattern and the second wiring pattern.

The switch may be, for example, a relay 22b, or may be a semiconductor switch that has a function equal to that of the relay 22b. Examples of such a semiconductor switch include a photocoupler, for example.

The AC load may be a heater of the fixing device 12. Since an AC voltage supplied from a commercial AC power supply is applied to the heater of the fixing device 12, reinforced insulation conforming to the safety standard needs to be ensured. The withstand voltage test is carried out using a human hand model. If the safety standard is revised, the hand model may be changed. For example, the size of the model may be reduced, or a joint may be added to the model. A thus-revised model (e.g. of a finger) can approach the AC load compared with the conventional model. Reinforced insulation can be ensured between a human hand and an AC load or an AC power supply by removing the bridge resistance. However, if the bridge resistance is removed, the relay 22b needs to be operated by the external power supply 90. That is to say, the circuit board pattern 25 is required, and the aforementioned measures for short-circuit are required.

The diode D2 functions as a restricting element that restricts the operating voltage supplied from the external power supply 90 being applied to the interlock power supply 41. Thus, the voltage Vtest is unlikely to be applied to the interlock power supply 41. The first wiring pattern and the second wiring pattern may be formed on a circuit board on which the switch and the switch drive circuit are mounted.

The AC input portion 21 functions as an input unit to which an AC voltage is input from an AC power supply or to which a test voltage is input from a test power supply. Each of the live line L and the neutral line N functions as a power supply line that connects the input unit and an AC load used in image formation. The relay 22b is provided on the power supply line, and functions as a switching unit that switches between a connecting state of connecting the input unit and the AC load to each other, and a disconnecting state of disconnecting the input unit and the AC load from each other. The interlock power supply 41 functions as a first power supply. The non-interlock power supply 42 functions as a second power supply. The drive circuit 23b functions as a switch drive unit that causes the switching unit to enter the connecting state when the operating voltage is being supplied thereto from the first power supply or the external power supply 90. The connecting portion 26 functions as a connecting unit that is connected to the external power supply 90. The circuit board pattern 25 functions as a first wire that connects the connecting unit and the switch drive unit to each other. Each of the patterns P2 and P4 functions as a second wire that is connected to the second power supply. Each of the Zener diodes ZD, ZD1, and ZD2 functions as a constant-voltage unit that is provided on the first wire. The constant-voltage unit is provided between a first section in which the distance between the first wire and the second wire satisfies a predetermined insulating condition, and a second section in which the distance between the first wire and the second wire does not satisfy the predetermined insulating condition.

The disclosure is not limited to the above embodiment, and various changes and modifications may be made within the spirit and scope of the disclosure. Accordingly, claims are attached to make the scope of the disclosure public.

Other Embodiments

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-243792, filed Dec. 26, 2018 which is hereby incorporated by reference herein in its entirety.

What is claimed is:

1. An image forming apparatus comprising:
an input portion to which an AC voltage is input from an AC power supply or to which a test voltage is input from a test power supply;
a power supply line that connects the input portion and an AC load used in image formation to each other;
a switch provided on the power supply line;
an interlock power supply configured to stop supplying a voltage if the AC power supply is supplying the AC voltage and an interlock condition is satisfied, and configured to supply a voltage if the AC power supply is supplying the AC voltage and the interlock condition is not satisfied, the interlock condition being a condition where an interlock acts;
a non-interlock power supply configured to supply a voltage independently of the interlock condition, if the AC power supply is supplying the AC voltage;
an interface to which an external power supply is connected;
a switch drive circuit configured to turn on the switch based on a predetermined switch-on signal in a state where the voltage from the interlock power supply is supplied, or due to the test voltage being supplied from the test power supply via the input portion and an operating voltage being supplied from the external power supply in a state where the voltage from the interlock power supply is not supplied;
a first wiring pattern that connects the interface and the switch drive circuit to each other;
a second wiring pattern that is connected to the non-interlock power supply; and
a constant-voltage element provided on the first wiring pattern,
wherein the constant-voltage element is provided between a first section of the first wiring pattern in which a distance between the first wiring pattern and the second wiring pattern satisfies a predetermined insulating condition, and a second section of the first wiring pattern in which the distance between the first wiring pattern and the second wiring pattern does not satisfy the predetermined insulating condition.

2. The image forming apparatus according to claim 1, wherein
the constant-voltage element is a constant-voltage diode.

3. The image forming apparatus according to claim 2, wherein
the constant-voltage diode is a Zener diode.

4. The image forming apparatus according to claim 3, wherein
an anode of the Zener diode is connected to the first section of the first wiring pattern, and a cathode of the Zener diode is connected to the second section of the first wiring pattern.

5. The image forming apparatus according to claim 1, wherein
the constant-voltage element is a plurality of constant-voltage diodes that are connected in series.

6. The image forming apparatus according to claim 5, wherein
the plurality of constant-voltage diodes are a plurality of Zener diodes.

7. The image forming apparatus according to claim 6, wherein
a cathode of a first Zener diode, of the plurality of Zener diodes, is connected to the second section of the first wiring pattern, and
an anode of a second Zener diode, of the plurality of Zener diodes, is connected to the first section of the first wiring pattern.

8. The image forming apparatus according to claim 1, wherein
when a withstand voltage test for the image forming apparatus is carried out, the AC power supply is not connected to the input portion, the test power supply is connected to the input portion, and the external power supply is connected to the interface, and
a voltage supplied from the external power supply is greater than or equal to a sum of a constant voltage realized by the constant-voltage element and an operating voltage required to turn on the switch.

9. The image forming apparatus according to claim 1, wherein
a constant voltage of the constant-voltage element is a voltage with which the switch does not turn on even if a voltage applied to the second wiring pattern is applied to the first wiring pattern.

10. The image forming apparatus according to claim 1, wherein
a difference between a voltage applied to the second wiring pattern and a constant voltage of the constant-voltage element is less than a voltage required to turn off the switch, and a difference between a voltage supplied from the external power supply and the constant voltage of the constant-voltage element is greater than or equal to a voltage required to turn on the switch.

11. The image forming apparatus according to claim 1, wherein
the switch is a relay or a semiconductor switch.

12. The image forming apparatus according to claim 1, wherein
the AC load is a heater of a fixing device.

13. The image forming apparatus according to claim 1, further comprising
a maintenance door that is opened when maintenance of the image forming apparatus is performed,
wherein the interlock condition is that the maintenance door is open.

14. The image forming apparatus according to claim 1, further comprising
a restricting element configured to restrict the operating voltage supplied from the external power supply being applied to the interlock power supply.

15. The image forming apparatus according to claim 1, wherein
the first wiring pattern and the second wiring pattern are formed on a circuit board on which the switch and the switch drive circuit are mounted.

16. An image forming apparatus comprising:
an input unit to which an AC voltage is input from an AC power supply or to which a test voltage is input from a test power supply;
a power supply line that connects the input unit and an AC load used in image formation to each other;
a switching unit configured to switch between a connecting state of connecting the input unit and the AC load to each other, and a disconnecting state of disconnecting the input unit and the AC load from each other, the switching unit being provided on the power supply line,
a first power supply configured to stop supplying a voltage if the AC power supply is supplying the AC voltage and an interlock condition is satisfied, and configured to supply a voltage if the AC power supply is supplying the AC voltage and the interlock condition is not satisfied, the interlock condition being a condition where an interlock acts;
a second power supply configured to supply a voltage independently of the interlock condition, if the AC power supply is supplying the AC voltage;
a connecting unit to which an external power supply is connected;
a switch drive unit configured to cause the switching unit to enter the connecting state when an operating voltage is being supplied from the first power supply or when the test voltage is being supplied from the test power supply via the input unit and an operation voltage is being supplied from the external power supply;
a first wire that connects the connecting unit and the switch drive unit to each other;
a second wire that is connected to the second power supply; and
a constant-voltage unit provided on the first wire,
wherein the constant-voltage unit is provided between a first section in which a distance between the first wire and the second wire satisfies a predetermined insulating condition, and a second section in which the distance between the first wire and the second wire does not satisfy the predetermined insulating condition.

* * * * *